United States Patent

[11] 3,609,166

[72] Inventors Walter Gauss
Cologne-Stammheim;
Heinz Herlinger, Korb/Waiblingen;
Herbert Thomas, Wuppertal-Elberfeld;
Manfred Plempel, Wuppertal-Elberfeld, all of Germany
[21] Appl. No. 753,716
[22] Filed Aug. 19, 1968
[45] Patented Sept. 28, 1971
[73] Assignee Farbenfabriken Bayer Aktiengesellschaft
Leverkusen, Germany
[32] Priority Aug. 29, 1967
[33] Germany
[31] F 53346 IVd/12p

[54] CARBAMIC ACID ESTERS OF BENZIONIDAZOLES
17 Claims, No Drawings
[52] U.S. Cl. .................................................. 260/309.2, 424/273
[51] Int. Cl. .................................................. C07d 49/38
[50] Field of Search ........................................ 260/309.2, 482 C

[56] References Cited
UNITED STATES PATENTS

| | | | |
|---|---|---|---|
| 2,755,286 | 7/1956 | Bell et al. ................... | 260/482 C |
| 2,876,090 | 3/1959 | Leeper et al. ................ | 260/482 C |
| 2,933,502 | 4/1960 | Klopping ...................... | 260/309.2 |
| 3,226,426 | 12/1965 | Hopkins et al. ............... | 260/482 C |
| 3,238,036 | 3/1966 | Herrett ....................... | 260/482 C |
| 3,325,506 | 6/1967 | Jones et al. .................. | 260/309.2 |
| 3,458,528 | 7/1969 | Gal ........................... | 260/309 |

FOREIGN PATENTS

| | | | |
|---|---|---|---|
| 960,538 | 6/1964 | Great Britain ................ | 260/482 C |
| 396,870 | 1/1966 | Switzerland .................. | 260/482 C |

OTHER REFERENCES

Adams et al. Chem. Rev. Vol. 65, pages 569–573 relied on (1965). QD1.A563

Larrouquere Bul. Soc. Chim. (France) A64, page 1543 QD1.S4

Murfitt German Application 1,051,842 3– 1959 (120 17/01) (2 page spec.) 260– 482 C Ridi et al. Ann. Chim. (Rome) Vol. 44, pages 28– 38 (1954) copy in group 120, 260– 309.2

Rosnati Bul. Soc. Chim (France) 1964, page 1542 QD1.S4

*Primary Examiner*—Natalie Trousof
*Attorney*—Jacobs & Jacobs

ABSTRACT: Carbamic acid esters are provided which, inter alia, have anthelmintic action against nematodes and fungicidal activity against *Aspegillus niger, fumigatus* and *nidulans, Trichophyton* species and *Candida albicans* at concentrations as low as 4 γ/ml. The esters have the formula:

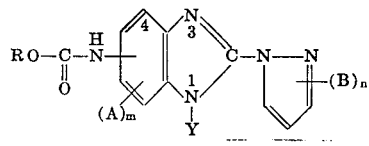

in which
T is hydrogen or alkyl,
A and B are the same or different and are each hydrogen, halogen, notro, lower alkyl or lower alkoxy,
$m$ and $n$ are 1 or 2, and
R is substituted or unsubstituted aliphatic, aralkyl, aryl or heterocyclic,
and are prepared by reacting an amine of the formula:

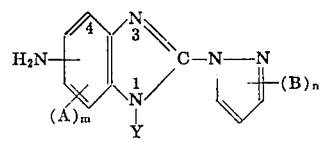

n which
Y is hydrogen or alkyl,
A and B are the same or different and are each hydrogen, halogen, notro, lower alkyl or lower alkoxy, and
$m$ and $n$ are 1 or 2,
with a carbonic acid derivative of the formula:

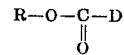

in which
R is unsubstituted or substituted aliphatic, aralkyl, aryl, or a heterocyclic radical, and
D is halogen, OR¹ or 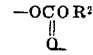
wherein $R^1$ and $R^2$ are the same or different and have any of the above meanings of R, or
R and D further being the residual constituents of the ring system of glycol carbonate and benzocatechol carbonate.

CARBAMIC ACID ESTERS OF BENZIONIDAZOLES

It has now been found that novel carbamic acid esters of benzimidazoles are obtained by reacting an amine of the formula:

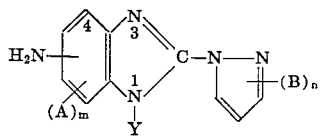

in which Y is hydrogen or alkyl, A is hydrogen, halogen, nitro or lower alkyl or lower alkoxy, B is the same as or different from A, and $m$ and $n$ are each 1 or 2, in per se known manner with a carbonic acid derivative of the formula:

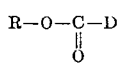

in which R is a substituted or unsubstituted aliphatic, aralkyl or aryl radical or a heterocyclic radical, and D is halogen, $OR^1$ or

$R^1$ and $R^2$ are the same or different and have any of the above meanings of R; R and D may further be the residual constituents of the ring system of glycol carbonate or benzocatechol carbonate, followed, if desired, by subsequent transesterification.

The alkyl radicals (Y) comprise straight-chain or branched radicals with 1–12, preferably 1–6, carbon atoms. The preferred halogen atoms (A or B) are fluorine, chlorine and bromine.

Amines which are used for the process are, for example:
2-[pyrazolyl-(1)]-4-amino-benzimidazole
2-[3-methyl-pyrazolyl-(1)]-4-amino-benzimidazole
2-[5-methyl-pyrazolyl-(1)]-4-amino-benzimidazole
2-[3,5-dimethyl-pyrazolyl-(1)]-4-amino-benzimidazole
2-[4-chloro-pyrazolyl-(1)]-4-amino-benzimidazole
2-[4-bromo-pyrazolyl-(1)]-4-amino-benzimidazole
2-[4-methoxy-pyrazolyl-(1)]-4-amino-benzimidazole
2-[4-methoxy-ethoxy-pyrazolyl-(1)]4-amino-benzimidazole
2-[pyrazolyl-(1)]-5-amino-benzimidazole
2-[3-methyl-pyrazolyl-(1)]-5-amino-benzimidazole
2-[5-methyl-pyrazolyl-(1)]-5-amino-benzimidazole
2-[3,5-dimethyl-pyrazolyl-(1)]-5-amino-benzimidazole
2-[4-chloro-pyrazolyl-(1)]-5-amino-benzimidazole
2-[4-bromo-pyrazolyl-(1)]-5-amino-benzimidazole
2-[4-methoxy-pyrazolyl-(1)]-5-amino-benzimidazole
2-[4-methoxy-ethoxy-pyrazolyl-(1)]-5-amino-benzimidazole
1-methyl-2-[pyrazolyl-(1)]-5-amino-benzimidazole
1-methyl-2-[pyrazolyl-(1)]-6-amino-benzimidazole and
1-methyl-2-[pyrazolyl-(1)]-7-amino-benzimidazole.

The amines used as starting compounds can be obtained by known processes (Belgian Pat. No. 656,016).

The optionally substituted aliphatic radicals (R) comprise alkyl radicals with 1–20 carbon atoms, preferably 1–6 carbon atoms, which may be straight-chain or branched and may contain a double bond, as well as corresponding cycloaliphatic radicals with 3–12, preferably five, six or eight carbon atoms, especially 5–6 carbon atoms, in the ring system. The optionally substituted aralkyl radicals (R) preferably comprise those with 6 or 10 carbon atoms in the aromatic part and 1–4 carbon atoms in the chain. The optionally substituted aryl radicals (R) comprise those with up to 10 carbon atoms in the ring system, preferably the benzene radical.

Examples of substituents in the aliphatic or aromatic radical are halogens (preferably fluorine, chlorine or bromine), hydroxy, carboxy, carbalkoxy with up to six carbon atoms in the alkyl radical, alkoxy (preferably 1–4 carbon atoms), and the dialkylamino radical with up to 10 carbon atoms (preferably 1–4 carbon atoms) in both alkyl radicals. The aromatic radical may further be substituted by alkyl groups (preferably of 1–4 carbon atoms) and by nitro groups (preferably only one).

Substituents in the aromatic part of the aralkyl radical are the aforesaid halogens (preferably fluorine, chlorine or bromine), alkyl groups (preferably of 1–4 carbon atoms), alkoxy groups (preferably of 1–4 carbon atoms), and the nitro group. Heterocyclic radicals (R) are primarily those with five or six ring members which may contain up to three identical or different hetero atoms. Besides oxygen and sulphur, the hetero constituent may also be the N-alkyl radical (preferably with up to eight carbon atoms). Heterocycles with one (or at most two) oxygen or sulfur atoms, in addition or not to nitrogen or an N-alkyl radical, are preferred.

Carbonic acid derivatives which are used for the process (cf. Houben-Weyl, Methoden der organischen Chemie, 4th Edition, Volume VIII, pages 137 et seq. and 101 et seq.) are for example: the methyl ester, ethyl ester, β-chloroethyl ester, n-propyl ester, isopropyl ester, n-butyl ester, isobutyl ester, tert.-butyl ester, n-amyl ester, dodecyl ester, benzyl ester, phenethyl ester, cyclohexyl ester, phenyl ester, α-naphthyl ester and the β-naphthyl ester of chlorocarbonic acid.

Examples of pyrocarbonic acid esters are pyrocarbonic acid di-methyl ester, di-ethyl ester, di-n-propyl ester, di-isopropyl ester, and di-n-butyl ester. Apart from these symmetrical pyrocarbonic acid di-esters, asymmetrical pyrocarbonic acid di-esters can also be used, such as are described in Liebigs Annalen der Chemie, 624, 30–36 (1959).

Examples of such compounds are: methyl-ethyl pyrocarbonic acid ester, β-chloroethyl-ethyl-pyrocarbonic acid ester, allyl-ethyl-pyrcarbonic acid ester, β-methoxyethyl-pyrocarbonic acid ester, benzyl-ethyl-pyrocarbonic acid ester, cyclohexyl-ethyl-pyrocarbonic acid ester, and phenyl-ethyl-pyrocarbonic acid ester.

When pyrocarbonic acid di-esters of asymmetrical structure are used, the lower alkyl radical, according to experience, is predominantly split off as an alkanol in the reaction with the amines, and there is formed the carbamic acid ester of the higher hydroxy compounds, for example:

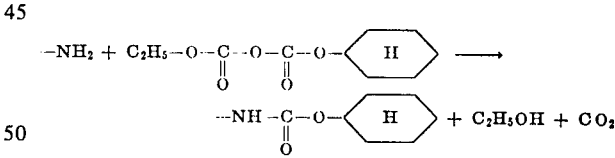

Carbonic acid di-esters, such as diethyl carbonate or diphenyl carbonate also react with the amines to form the desired urethanes according to the following general equation:

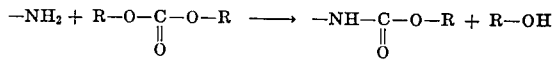

The process can also be extended to carbonic acid esters of cyclic structure, such as glycol carbonate or benzocatechol carbonate. In the case of the two last-mentioned compounds, the amines are converted into the corresponding carbamic acid-β-hydroxy-ethyl esters and carbamic acid-ortho-hydroxy-phenyl esters:

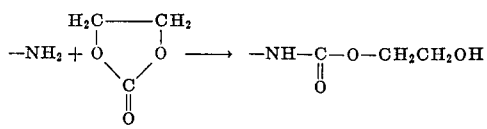

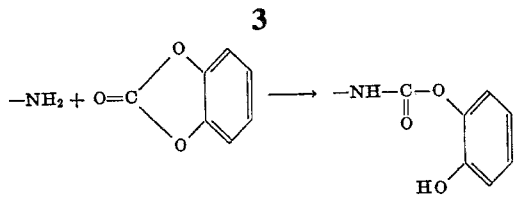

As esters, the new urethanes the preparation of which has been described in greater detail above are suitable for transesterification reactions. It is possible, for example, to convert the carbamic acid aryl esters of the formula -NH-CO-O-aryl where aryl can denote, for instance, a phenyl radical, with compounds containing aliphatically linked hydroxyl to form new urethanes:

Clearly, it is possible to exchange in the urethanes

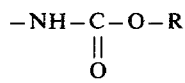

a lower alkyl radical R for a higher, optionally substituted alkyl radical.

The products produced by the process are isolated and purified by per se known methods. They are mostly obtained in solid form and are characterized by an unlimited storability.

The new compounds which can be obtained by the present process correspond to the formula:

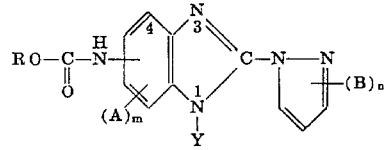

in which the radicals A, B, Y, R, m and n have the same meaning as above.

The new compounds are useful for human and veterinary medicine. They exhibit favorable effects in the case of worm infections, especially against nematodes. They also have fungicidal effects against Aspergillus niger, Aspergillus fumigatus, Aspergillus nidulans and against Trichophyton species and Candida albicans at concentrations as low as 4 gamma per milliliter. The route of administration and mode of use in a vehicle or carrier is the same as with known active agents.

The following tables Nos. 1 and 2 represent the anthelmintic effect of the new compounds produced in accordance with working examples 1 and 7.

| Strains of parasites | Stage | Therapy | Compound | Dos. in mg./kg./reduction of parasites in percent (found after section) | | | | | | | |
|---|---|---|---|---|---|---|---|---|---|---|---|
| | | | | 1,000 | 500 | 250 | 100 | 50 | 25 | 10 | 5 |
| Hymenopepis nana-M | Adult | 4 x p.o. | 7 | 100 | 100 | 60 | | 100 | 0 | | |
| | | 4 x p.o. | 2-Thiaz | | 0 | 0 | | | | | |
| | | 5 x s.c. | 1 | 100 | 100 | | | | | | |
| | | 5 x s.c. | 2-Thiaz | 82 | 0 | | | | | | |
| Hymenolepis diminuta-R | Adult | 4 x p.o. | 7 | | 100 | 100 | 100 | 100 | 100 | 100 | |
| | | 5 x p.o. | 2-Thiaz | | 100 | 99 | 0 | | | | |
| Hymenolepis microstoma-M | Adult | 5 x p.o. | 1 | 100 | 80 | 75 | 90 | 0 | | | |
| | | 5 x p.o. | 2-Thiaz | 97 | 75 | 0 | | | | | |
| | | 5 x s.c. | 1 | 100 | 86 | ~50 | 0 | | | | |
| Cysticercus-M | Larvae | 5 x p.o. | 1 | 100 | 100 | ~90 | 0 | | | | |
| Strongyloides ratti-R | Adult | 3 x p.o. | 7 | 100 | 100 | 100 | 100 | 100 | 100 | 100 | |
| | | 3 x p.o. | 2-Thiaz | 100 | 100 | 100 | 100 | 90 | 0 | | |
| | | 3 x s.c. | 1 | | 100 | 100 | 100 | 100 | 86 | 0 | |
| | | 3 x s.c. | 2-Thiaz | | 100 | 100 | 99 | 47 | 0 | | |
| | Larvae (55 hours) | 1 x p.o. | 1 | 99 | 100 | 99 | 100 | 100 | 90 | 38 | 0 |
| | | 1 x p.o. | 2-Thiaz | 100 | 100 | 99 | 85 | 80 | 73 | 0 | |
| | Adult | 1 x p.o. | 1 | | 100 | 100 | 100 | 97 | 99 | 36 | 0 |
| | | 1 x p.o. | 2-Thiaz | 100 | 100 | 100 | 100 | 100 | 37 | 24 | 0 |
| Ascaris-Larvae-M | Larvae | 5 x p.o. | 1 | 99 | 87 | ~50 | ~50 | | | | |
| | | 5 x s.c. | 1 | 99 | 90 | 90 | 0 | | | | |
| Aspiculuris-M (Oxyura) | Adult | 4 x p.o | 7 | 100 | 100 | 80 | 80 | 0 | | | |
| | | 4 x p.o. | 2-Thiaz | 100 | 0 | 0 | | | | | |
| Syphacia-M (Oxyura) | Adult | 4 x p.o. | 1 | 100 | 100 | 100 | 98 | 95 | 88 | 55 | |
| | | 4 x p.o. | 2-Thiaz | 100 | 100 | 95 | 90 | 76 | 61 | | |
| Heterakis-M | Adult | 4 x p.o. | 7 | 100 | 100 | 100 | 100 | 50 | 0 | | |
| | | 4 x p.o. | 2-Thiaz | | 100 | 0 | | | | | |
| Nippostrongylus-M | Adult | 4 x p.o. | 1 | 100 | 100 | 86 | 38 | 0 | | | |
| | Larvae (3) | 1 x p.o. (15 hours) | 1 | 100 | 90 | 63 | 42 | 0 | | | |
| | Larvae (3/4) | 1 x p.o. (38 hours) | 1 | 100 | 100 | 87 | 49 | 0 | | | |
| | Larvae (4/5) | 1 x p.o. (96 hours) | 1 | 100 | 99 | 64 | 26 | 0 | | | |
| Nematospiroides-M | Adult | 5 x p.o. | 1 | 100 | 100 | 66 | 18 | 0 | | | |
| | Larvae (4) | 1 x p.o. | 1 | 89 | 96 | 72 | 62 | 0 | | | |
| Trichinella-M (Gut-stage) | Adult | 4 x p.o. | 7 | 100 | 100 | 100 | 100 | 100 | 85 | 38 | |
| | | 4 x p.o. | 2-Thiaz | | 100 | 100 | ~50 | 0 | | | |
| Trichinella-M (Muscle-stage) | Larvae | 4 x p.o. | 7 | 100 | 100 | ~50 | ~80 | 0 | 0 | | |
| | | 5 x p.o. | 2-Thiaz | | 0 | | | | | | |
| Trichuris-M | Adult | | 7 | 100 | 100 | 40 | | | | | |
| | | | 2-Thiaz | | 0 | | | | | | |

NOTE: 2-Thiaz.=2-[Thiazolyl-(4')]-benzimidazole for comparison; 1=Ethylester according to Example 1; 7=Isopropylester according to Example 7.

| Host | Parasite | Stage respectively/ age of infection at time of treatment | Example No. | Dose in mg./kg. per os reduction of parasites in percent after section | | | | | | |
|---|---|---|---|---|---|---|---|---|---|---|
| | | | | 100 | 80 | 50 | 40 | 25 | 20 | 10 |
| Sheep | Haemonchus contortus | Adult/21-44 days | 7 | 100 | 100 | 84-87 | 83-96 | | 69-94 | 30-51 |
| | | | 1 | 98 | | 91 | | | | |
| | | | Thiabendazol | | 100 | 100 | 100 | | 74-88 | 38-8 |
| Sheep | Haemonchus contortus | 5. Larvae/12 days | 7 | 99 | | 61-72 | | | | |
| | | | 1 | 97 | | 41 | | | | |
| | | | Thiabendazol | | | 100 | | | | |
| Sheep | Haemonchus contortus | 4. Larvae/6 days | 7 | 96 | | 22-78 | | | | |
| | | | 1 | 85 | | 35 | | | | |
| | | | Thiabendazol | | | 99-100 | | | | |
| Sheep | Trichostrongylus colubriformis | Adult/21-22 days | 7 | | 100 | 99 | 98 | | 11 | 0 |
| | | | Thiabendazol | | | | 100 | | 100 | 78 |
| Sheep | Trichostrongylus colubriformis | 5. Larvae/12 days | 7 | | | 97 | | | | |
| | | | Thiabendazol | | | 100 | | | | |
| Sheep | Trichostrongylus colubriformis | 4. Larvae/6 days | 7 | | | 98 | | | | |
| | | | Thiabendazol | | | 100 | | | | |

Table – Continued

| Host | Parasite | Stage respectively/ age of infection at time of treatment | Example No. | Dose in mg./kg. per os reduction of parasites in percent after section | | | | | | |
|---|---|---|---|---|---|---|---|---|---|---|
| | | | | 100 | 80 | 50 | 40 | 25 | 20 | 10 |
| Sheep | Ostertagia circumcincta | Adult/21-22 days | 7 | 96 | | 81 | | | | |
| | | | Thiabendazol | 100 | | | | | | |
| Sheep | Ostertagia circumcincta | 5. Larvae/12 days | 7 | | | 0 | | | | |
| | | | Thiabendazol | | | 87 | | | | |
| Sheep | Ostertagia circumcincta | 4. Larvae/6 days | 7 | | | 11 | | | | |
| | | | Thiabendazol | | | 44 | | | | |
| Sheep | Oesophagostomum columbianum | Adult/52 days | 7 | 100 | | | 98 | 71 | | 24 |
| Sheep | Oesophagostomum columbianum | 4. Larvae/21 days | 7 | | | 100 | | | | |
| Sheep | Oesophagostomum columbianum | 4. Larvae/12 days | 7 | | | 83 | | | | |
| | | | Thiabendazol | | | 81 | | | | |
| Sheep | Oesophagostomum columbianum | 4. Larvae/6 days | 7 | | | 71 | | | | |
| | | | Thiabendazol | | | 100 | | | | |
| Sheep | Strongyloides papillosus | Adult/9 days | 7 | 100 | | 100 | | 100 | | |
| | | | Thiabendazol | | | 100 | | 100 | | |
| Sheep | Bunostomum trigonocephalum | Adult/82 days | 7 | | 93 | 7 | | | | |
| Cow | Cooperia punctata | Adult/21 days | 7 | | | 55 | | | | |
| | | 5. Larvae/12 days | 7 | | | 66 | | | | |
| | | 4. Larvae/6 days | 7 | | | 55 | | | | |
| Pig | Strongyloides ransomi | Adult/10 days | 7 | | | 97 | | 47 | | |
| | | | Thiabendazol | | | | | 100 | | |

Similar good effects are obtained with the other compounds in accordance with the invention.

EXAMPLE 1

40.5 g. (0.25 mole) of pyrocarbonic acid diethyl ester are added dropwise within 1 hour to a suspension consisting of 39.8 g. (0.2 mole) of 2-[pyrazolyl-(1)]-5amino-benzimidazole and 100 ml. of ethanol. With the evolution of $CO_2$, a solution is initially formed, from which the reaction product is later precipitated. On the following day there are added 150 ml. of petroleum ether, the product is filtered off with suction, washed with petroleum ether and dried. Yield: 49.9 g. of the compound of the formula:

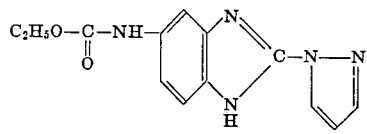

m.p. 180°–181° C.

For analysis, a sample was recrystallized from boiling ethyl acetate/light petrol and dried at 110° C.
$C_{13}H_{13}N_5O_2$ (molecular weight 271.27)
Calculated: C 57.56% H 4.83% N 25.82% O 11.80%
Found: C 57.57% H 5.08 N 25.35 O 12.45%

The 2-[pyrazolyl-(1)]-5-amino-benzimidazole used as starting material was obtained as follows:

203.5 g. of 2-[pyrazolyl-(1)]-5-nitro-benzimidazole (prepared according to Belgian Pat. No. 656,016) are hydrogenated in 2 liters of dimethyl formamide in the presence of 80 g. of Raney nickel at 60° C. with hydrogen under a maximum pressure of 60 atmospheres gauge, until the absorption of gas is terminated. The mixture is filtered off with suction from the catalyst and concentrated in a water jet vacuum, finally at 95° C.

The residue crystallizes slowly. There are obtained 175 g. of crude product of m.p. 181°–182° C., which can be recrystallized from water with the addition of charcoal for purification. The compound then melts at 185°–186° C.

EXAMPLE 2

53.2 g. (0.25 mole) of 1-methyl-2-[pyrazolyl-(1)]-5-amino-benzimidazole are dissolved in 250 ml. of ethanol by heating. The solution is cooled to room temperature and 50.6 g. (0.3125 mole) of pyrocarbonic acid diethyl ester are added dropwise within 30 minutes while stirring. A thick slurry is formed, to which a further 50 ml. of ethanol are added. The reaction is completed by bringing the mixture to the boil once. After cooling to 0° C. the reaction product is filtered off with suction, and washed with ethanol at −20° C. There are obtained 62.5 g. of the compound of the formula:

m.p. 164.5°–165.5° C.
After recrystallization from ethanol: m.p. 167°–168° C.
$C_{14}H_{15}N_5O_2$ (molecular weight 258.30)
Calculated: C 58.93% H 5.30% N 24.55% O 11.22%
Found: C 58.8% H 5.3% N 24.7% O 11.2%

The 1-methyl-2-[pyrazolyl-(1)]-5-amino-benzimidazole used as starting material was obtained as follows:

24.3 g. (0.1 mole) of 1-methyl-2-[pyrazolyl-(1)]-5-nitrobenzimidazole (m.p. 217.5°–219° C.) which can be obtained by analogy with the process described in Belgian Pat. No. 656,016 from 1-methyl-2-hydrazino-5-nitro-benzimidazole by condensation with 1,1,3,3-tetramethoxy-propane, are hydrogenated in 150 ml. of dioxan with hydrogen in the presence of 5 g. of Raney nickel as catalyst at 20° C. and a maximum pressure of 40 atmospheres gauge, until the absorption of gas is terminated. The mixture is separated from the catalyst, the solvent is removed in a water jet vacuum at a maximum bath temperature of 80° C., and 19.2 g. of crude product of m.p. 127°–128° C. are obtained as residue. By recrystallizing once from toluene with the addition of charcoal and drying at 110° C., there is obtained the completely pure amino compound of m.p. 130.5°–131° C.
$C_{11}H_{11}N_5$ (molecular weight 213.24)
Calculated: C 61.95% H 5.20% N 32.85%
Found: C 62.0% H 5.4% N 33.1%

EXAMPLE 3

17.8 g. (0.11 mole) of pyrocarbonic acid diethyl ester are added in one jet at 0°–5° C., while stirring, to a mixture of 19.9 g. (0.1 mole) of 2-[pyrazolyl-(1)]-4-amino-benzimidazole and 100 ml. of ethanol, and the cooling bath is removed. On the following day the reaction mixture which has become thick is mixed with 50 ml. of ethanol, brought to the boil and allowed to cool. The precipitated reaction product is finally isolated at 0° C. and dried at 110° C. There are obtained 20.0 g. of the compound of the formula:

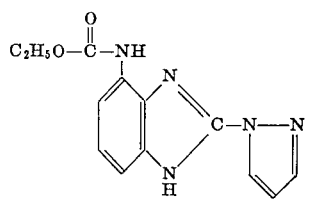

and m.p. 186°–187° C.

Recrystallization from ethanol does not lead to a change of the melting point.

$C_{13}H_{13}N_5O_2$ (molecular weight 271.27)
Calculated: C 56.56% H 4.83% N 25.82% O 11.80%
Found: C 57.3% H 4.9% N 25.9% O 11.9%

The 2-[pyrazolyl-(1)]-4-amino-benzimidazole used as starting material was obtained as follows:

26.1 g. of 2-[pyrazolyl-(1)]-4nitro-benzimidazole which can be obtained by analogy with the process described in Belgian Pat. No. 656,016 from 2-hydrazino-4-nitro-benzimidazole by condensation with 1,1,3,3-tetramethoxy-propane, are hydrogenated in 170 ml. of dioxan in the presence of 10 g. of Raney nickel with hydrogen at 40° C. and a maximum pressure of 50 atmospheres gauge, until the absorption of gas is terminated. The mixture is separated from the catalyst and freed from the solvent in a water jet vacuum. As residue there is obtained a brittle resin which is dissolved at 50° C. in 228 ml. of 1N HCl. Impurities are removed by means of charcoal. Sodium bicarbonate is then slowly added with stirring until the pH is 7, the precipitated amino compound is filtered off with suction and recrystallized from plenty of water with the addition of charcoal. For analysis, the product was dried in a vacuum at 100° C. over $P_2O_5$ until the weight remained constant; m.p. 156.5°–158° C.

$C_{10}H_9N_5$ (molecular weight 199.21)
Calculated: C 60.29% H 4.55% N 35.16%
Found: C 60.2% H 4.5% N 35.3%

The other amines used for the process can be obtained in an analogous manner.

EXAMPLE 4

22.1 g. (0.165 mole) of pyrocarbonic acid dimethyl ester are added dropwise within 1 hour while stirring to a suspension consisting of 29.85 g. (0.15 mole) of 2-[pyrazolyl-(1)]-5-amino-benzimidazole and 60 ml. of methanol. During that time the mixture initially becomes thinner and then again very thick. To achieve a better mixing effect a further 165 ml. of methanol are added. After cooling on the following day to −20° C., the reaction product is filtered off with suction, washed with methanol of −60° C. and dried at 110° C. 33.8 g. of the compound of the formula:

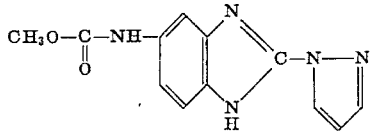

of melting point 215°–217° C. are obtained. If desired, the compound can further be purified by redissolving from 70 times the quantity of chlorobenzene.

$C_{12}H_{11}N_5O_2$ (molecular weight 257.25)
Calculated: C 56.02% H 4.31% N 27.23% O 12.44
Found: C 56.0% H 4.5% N 27.0% O 12.6%

EXAMPLE 5

40.9 g. (88 percent) of pyrocarbonic acid-di-n-butyl ester (0.165 mole) are added dropwise within 40 minutes while stirring to a suspension consisting of 29.85 g. (0.15 mole) of 2-[pyrazolyl-(1)]-5-amino-benzimidazole and 90 ml. of n-butanol. A clear solution is obtained which is converted into a thick paste after inoculation. 50 ml. of n-butanol are then added. On the following day the reaction product is filtered off with suction at 0° C., washed with petroleum ether and dried at 110° C. 35.5 g. of the compound of the formula:

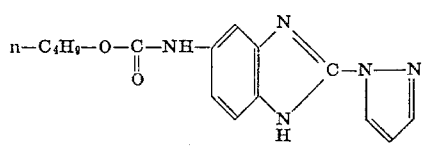

of melting point 173.5°–175° C. are obtained. By a single recrystallization step from 10 times the quantity of chlorobenzene the melting point is raised to 175.5°–176° C.

$C_{15}H_{17}N_5O_2$ (molecular weight 299.33)
Calculated: C 60.19% H 5.72% N 23.40% O 10.69%
Found: C 60.7% H 6.1% N 22.8% O 10.7%

EXAMPLE 6

47.5 g. (0.25 mol) of pyrocarbonic acid-di-n-propyl ester are added dropwise within 50 minutes to a suspension consisting of 39.8 g. (0.2 mol) of 2-]pyrazolyl-(1)]-5-amino-benzimidazole and 80 ml. of n-propanol. A clear solution is obtained which is solidified to a thick paste after inoculation. On the following day the paste is stirred with 750 ml. of ligroin. The reaction product is filtered off with suction and dried at 110° C. 54.8 g. of the compound of the formula

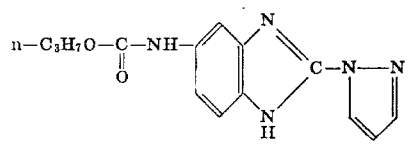

of melting point 171.5°–172.5° C. are obtained. The product can be recrystallized from hot n-propanol/hot ligroin. The melting point remains however unchanged.

$C_{14}H_{15}N_5O_2$ (molecular weight 285.30)
Calculated: C 58.93% H 5.30% N 24.55% O 11.22%
Found: C 58.8% H 5.5% N 24.424.4% % O 11.6%

EXAMPLE 7

62.7 g. (0.33 mol) of pyrocarbonic acid di-isopropyl ester are added dropwise within 20 minutes while stirring to a suspension consisting of 59.7 g. (0.3 mol) of 2-[pyrazolyl-(1)]-5-amino-benzimidazole and 300 cc. of iso-propanol. First a clear solution is obtained, from which the desired product is separated off. On the following day the product is isolated while cooling with ice and dried at 110° C. 57.9 g. of the compound of the formula

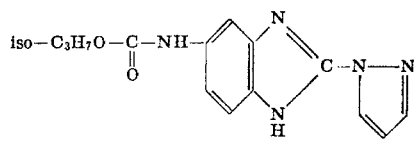

of melting point 180.5° to 181.5° C. are obtained.
$C_{14}H_{15}N_5O_2$ (molecular weight 285.30)
Calculated C 58.93% H 5.30% N 24.55% O 11.22%
Found: C 58.9% H 5.4% N 24.3% O 11.7%

EXAMPLE 8

A suspension consisting of 45.8 g. (0.2 mol) of 2-[4-methoxy-pyrazolyl-(1)]-5-amino-benzimidazole and 200 ml. of ethanol are reacted dropwise while stirring with 35.64 g. (0.22 mol) of pyrocarbonic acid diethyl ester. First the starting material is dissolved and later on the reaction product crystallizes out. On the following day the reaction product is separated off at 0° C. and left drying. 56.8 g. of the compound of the formula

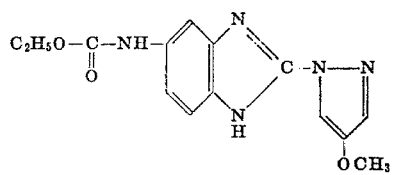

of melting point 209.5°–210.5° C. are obtained. After recrystallizing from ethanol the product melts at 210°–211.5° C.

$C_{14}H_{15}N_5O_3$ (molecular weight 301.30)
Calculated: C 55.80% H 5.02% N 23.25% O 15.93%

Found: C 56.1% H 5.1% N 22.7% O 16.2%

The 2-[4-methoxy-pyrazolyl-(1)]-5-amino-benzimidazole used as starting material was prepared as follows:

a. 2-[4-methoxy-pyrazol-(1)]-5-nitro-benzimidazole 386 g. (2 moles) of 2-hydrazino-5-nitro-benzimidazole, 1588 ml. of water, 412.5 ml. (5 moles) of concentrated hydrochloric acid and 300 ml. of methanol are combined while stirring. 387 g. (3 moles) of 2-methoxy-3-dimethylamino-acrolein are added at 40° C. The temperature rises to 48.5° C. 45 minutes after the beginning of the experiment the mixture is heated up and kept at 80° C. for 2 hours. The precipitated reaction product is filtered off with suction at room temperature, washed first with water until chlorine-free and then with methanol, dried at first in the atmosphere and then at 110° C. 306 g. of the compound of melting point 229.5°–231° C. are obtained.

b. 2-[4-methoxy-pyrazolyl-(1)]-5-amino-benzimidazole 259 g. (1 mole) of the nitro compound obtained according to (a) are hydrogenated in 1.8 l. of ethanol in the presence of 50 g. of Raney nickel with hydrogen gas at 50° C. and a pressure of 60 atmospheres. The precipitated reduction product is dissolved by heating and adding a little dimethylformamide, is separated by suction filtration and the product concentrated by evaporation in a water-jet vacuum up to a bath temperature of 90° C. The residue is recrystallized from anisol; the product melts at 211°–212° C.

EXAMPLE 9

The compound of the formula

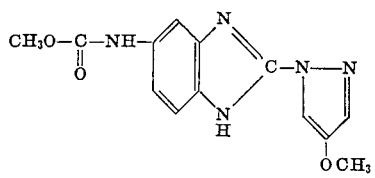

of melting point 235°–235.5° C. is obtained analogously to example 8 from 2-[4-methoxy-pyrazolyl-(1)]-5-amino-benzimidazole and pyrocarbonic acid dimethyl ester in methanol as solvent.

$C_{13}H_{13}N_5O_3$ (molecular weight 287.27)
Calculated: C 54.35% H 4.56% N 24.38% O 16.71%
Found: C 54.1% H 4.7% N 24.4% O 16.8%

EXAMPLE 10

14.74 g. (0.11 mole) of pyrocarbonic acid dimethylester are added dropwise within 15 minutes to a suspension consisting of 22.7 g. (0.1 mole) of 2-[3,5-dimethylpyrazolyl-(1)]-5-amino-benzimidazole and 100 ml. of methanol. The starting material dissolves. On the following day the material is concentrated in a vacuum and heated finally at a bath temperature of 49° C. As a residue there is obtained a vitreous scum which is taken up in 100 ml. of warm toluene. Upon cooling the desired product of the formula

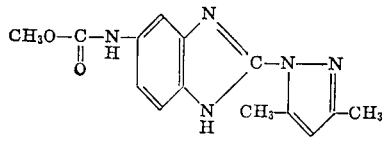

is precipitated from the solution. The product is filtered off with suction at 0° C., washed with petroleum ether and dried. 27.1 g. of melting point 185°–186.5° C. are obtained. Upon recrystallization from toluene the product is obtained with toluene of crystallization which is removed by dissolving the same in six times the quantity of hot acetonitrile and briefly heated to boil. The solvent-free substance precipitates. The substance is filtered off with suction in the cold, washed with ether and dried at 110° C. 17.6 g. of compound of melting point 186°–186.5° C. are obtained.

$C_{14}H_{15}N_5O_2$ (molecular weight 285.30)

Calculated: C 58.93% H 5.30% N 24.55% O 11.22%
Found: C 58.9% H 5.3% N 24.4% O 11.3%

The amino compound used as starting material was prepared by condensation of 2-hydrazino-5-nitro-benzimidazole with acetylacetone to yield 2[3,5-dimethyl-pyrazolyl-(1)]-5-nitro-benzimidazole and subsequent reduction of the nitro group to the amino group; melting point 221.5°–222° C.

EXAMPLE 11

17.82 g. (0.11 mole) of pyrocarbonic acid diethylester are added dropwise to the suspension of 22.7 g. (0.1 mole) of 2-[3,5dimethylpyrazolyl-(1)]-5-amino-benzimidazole in 100 ml. of ethanol whereupon the starting material gradually dissolves. On the following day a crystal paste has formed. After cooling to −20° C. the product is filtered off with suction and washed with petroleum ether. 18.5 g. of the compound of the formula

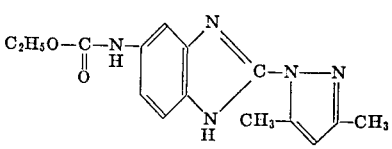

are obtained with ethanol of crystallization which is removed by gradually raising the drying temperature to 110° C. to constant weight. The preparation melts then at 175°–175.5° C.

$C_{15}H_{17}N_5O_2$ (molecular weight 299.33)
Calculated: C 60.19% H 5.72% N 23.40% O 10.69%
Found: C 60.0% H 5.7% N 23.3% O 10.9%

EXAMPLE 12

20.9 g. (0.11 mole) of pyrocarbonic acid diisopropyl ester are added dropwise to 22.7 g. (0.1 mole) of 2-[3,5-dimethyl-pyrazolyl-(1)]-5-amino-benzimidazole in 100 ml. of isopropanol. A solution gradually forms from which the desired compounds of the formula

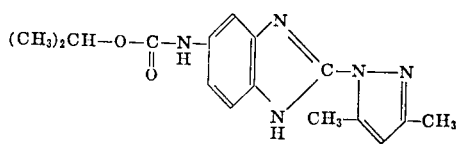

is later precipitated with isopropanol of crystallization. The compound is filtered off by suction at −20° C., washed with petroleum ether and left drying (29.5 g.). The crystal solvent is removed by dissolving the mixture in the smallest possible quantity of boiling acetonitrile, boiling for a short period of time whereupon the solvent-free compound precipitates, cooling, isolating at −20° C. and drying at 110° C. The melting point is then at 178.5°–170° C.

$C_{16}H_{19}N_5O_2$ (molecular weight 313.35)
Calculated: C 61.32% H 6.11% N 22.35% O 10.21%
Found: C 61.4% H 6.2% N 22.4% O 10.5%

EXAMPLE 13

47.8 ml. (0.5 mole) of chloroformic acid ethylester are added dropwise at 0°–5° C within 2.5 hours to a thoroughly stirred mixture of 99.5 g. (0.5 mole) of 2-[pyrazolyl-(1)]-5-amino-benzimidazole and 250 ml. of pyridine. On the following day 155 ml. of pyridine are distilled off in a vacuum. The paste obtained as residue is stirred with 3 l. of water whereupon the reaction product completely precipitates. The product is filtered off with suction, washed with water and dried at first in the atmosphere and then at 110° C. 123 g. of melting point 177.5°–179° C. are obtained. After recrystallizing from eight times the quantity of propionitrile there are obtained 115 g. of a pure compound of melting point 180.5° C. This compound is identical to the product according to example 1 in respect of all properties.

EXAMPLE 14

34.6 g. (0.25 mole) of chloroformic acid-β-methoxyethylester are added dropwise at 0°–5° C. within 2 hours while vigorously stirring to a mixture consisting of 49.75 g. (0.25 mole) of 2-[pyrazolyl-(1)]-5-amino-benzimidazole and 125 ml. of pyridine. On the following day 45 ml. of pyridine are distilled off in a vacuum. As a residue there is obtained a paste which can hardly be stirred any longer. By the dropwise addition of 120 ml. of water an emulsion is formed. The emulsion is stirred with 3 l. of water. After some time the desired compound of the formula

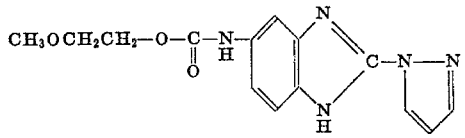

precipitates in solid form. The compound is filtered off with suction, washed with water and left drying: Yield 57.8 g. The crude product is stirred with 120 ml. of acetonitrile at 70° C. for 1 hour, a further 50 ml. of acetonitrile are added, the product is filtered off at 0° C., washed with ice cold acetonitrile and left drying. The product (49.0 g. of melting point 156°–158.5° C.) can be recrystallized from acetonitrile, if desired. By recrystallizing the melting point is not raised.
$C_{14}H_{15}N_5O_3$ (301.30)
Calculated: C 55.80% H 5.02% N 23.25% O 15.93%
Found: C 55.9% H 5.2% N 23.2% O 16.3% 6.3

EXAMPLE 15

30.6 g. (0.25 mole) of chloroformic acid isopropyl ester are added dropwise while cooling with ice and stirring within 2 hours to a mixture of 49.75 g. (0.25 mole) of 2-[pyrazolyl-(1)]-5-amino-benzimidazole and 125 ml. of pyridine. On the following day 80 ml. of pyridine are distilled off in a vacuum at a bath temperature of 40° C. By stirring the remaining mass with 3 l. of water solidification occurs. The mass is filtered off with suction, washed with water and dried. The crude product (67.9 g.) is recrystallized from propionitrile; m.p. 205°–206° C. The compound is the higher melting modification of the product according to example 7.

EXAMPLE 16

35.75 g. (0.25 mol) of chloroformic acid-β-chloroethyl ester are added dropwise while cooling with ice and stirring to 49.75 g. (0.25 mol) of 2-[pyrazolyl-(1)]-5amino-benzimidazole in 125 ml. of pyridine. On the following day 45 ml. of pyridine are distilled off from the reaction mixture at a bath temperature of at most 49° C. The mass obtained as residue is stirred with 3 l. of water whereupon recrystallization gradually occurs. The mass is then filtered off with suction, washed with water and dried. 77 g. of the crude compound

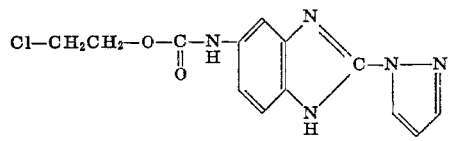

are obtained. The compound is purified by dissolution in 150 ml. of warm dimethylformamide and precipitates while stirring with 1.5 l. of acetonitrile. The product is filtered off with suction, washed with ether and dried at 110° C; yield 55 g. of m.p. 189°–189.5° C.
$C_{13}H_{12}ClN_5O_2$ (305.5)
Calculated: C 51.10% H 3,93% CL 11.61% N 22.90% O 10.48%
Found: C 51.1% H 4.3% CL 11.4% N 22.7% O 10.40%

EXAMPLE 17

40.6 g. (0.25 mol) of chloroformic acid cyclohexyl ester are added dropwise within 60 minutes to a solution of 49.75 g. (0.25 mol) of 2-[pyrazolyl-(1)]-5-amino-benzimidazole in 200 ml. of pyridine which is stirred while cooling with ice. On the following day 140 ml. of pyridine are distilled off in a vacuum. The mass obtained as a residue is vigorously stirred with 3 l. of water, whereupon the desired compound of the formula

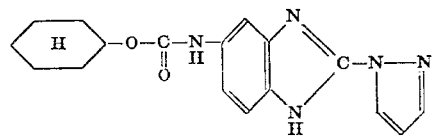

precipitates in solid form. The compound is filtered off with suction, washed with water and dried at 80° C. The crude product is purified by recrystallization from 15 times the quantity of propionitrile and dried at 110° C: yield 66 g. of m.p. 205°–206° C.

EXAMPLE 18

The procedure as described in example 17 is followed; however 41.1 g. (0.25 mol) of chloroformic acid-n-hexylester are used instead of chloroformic acid cyclohexylester. The desired compound of the formula

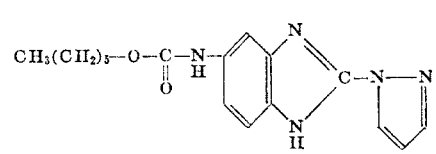

is obtained in a yield of 76.7 g. of m.p. 123°–125° C. After recrystallization once from propionitrile the product is completely pure; m.p. 130°–131° C.

What is claimed is:

1. A compound of the formula

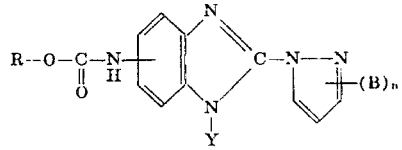

in which Y is hydrogen or lower alkyl, B is hydrogen, lower alkyl or lower alkoxy, n is the integer 1 or 2, and R is straight or branched chain alkyl of one to six carbon atoms unsubstituted or substituted by halogen or lower alkoxy or is cycloalkyl of five or six carbon atoms.

2. A compound of claim 1 having the formula:

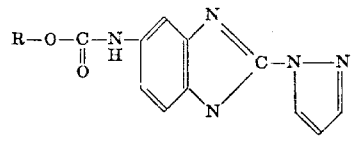

in which R is straight or branched chain alkyl of one to six carbon atoms unsubstituted or substituted by halogen or lower alkoxy.

3. A compound according to claim 1 wherein Y is hydrogen.
4. A compound according to claim 1 wherein Y is lower alkyl.
5. A compound according to claim 1 wherein B is hydrogen.
6. A compound according to claim 1 wherein B is lower alkyl.
7. A compound according to claim 1 wherein B is lower alkoxy.
8. A compound according to claim 1 wherein R is straight or branched chain alkyl of one to six carbon atoms unsubstituted or substituted by halogen or lower alkoxy.

9. A compound according to claim 1 wherein R is cycloalkyl of five or six carbon atoms.

10. A compound according to claim 1 wherein R is haloalkyl of one to six carbon atoms.

11. A compound according to claim 1 wherein R is lower alkoxy alkyl of one to four carbon atoms in the alkoxy moiety and of one to six carbon atoms in the alkyl moiety.

12. A compound according to claim 1 wherein R is lower alkyl of one to six carbon atoms.

13. A compound according to claim 1 wherein Y is hydrogen or methyl, B is hydrogen, methyl or methoxy, and R is straight or branched chain alkyl of one to six carbon atoms unsubstituted or substituted by chlorine or methoxy or is cyclohexyl.

14. The compound of claim 1 which is 2-[pyrazolyl-(1)]-5-methoxy-carbonylamino-benzimidazole.

15. The compound of claim 1 which is 2-[pyrazolyl-(1)]-5-ethoxy-carbonylamino-benzimidazole.

16. The compound of claim 1 which is 2-[pyrazolyl-(1)]-5-n-propoxy-carbonylamino-benzimidazole.

17. The compound of claim 1 which is 2-[pyrazolyl-(1)]5-iso-propoxy-carbonylamino-benzimidazole.

UNITED STATES PATENT OFFICE
CERTIFICATE OF CORRECTION

Patent No. 3,609,166        Dated September 28, 1971

Inventor(s) Walter Gauss, Heinz Herlinger, Herbert Thomas and Manfred Plempel

It is certified that error appears in the above-identified patent and that said Letters Patent are hereby corrected as shown below:

In the title, change "BENZIONIDAZOLES" to -- BENZIMIDAZOLES --

In the Abstract, line 8, change "T" to -- Y -- line 10, change "notro" to -- nitro -- line 16, change "n" to -- in -- line 19, change "notro" to -- nitro --

In Column 1, line 1, change "BENZIONIDAZOLES" to -- BENZIMIDAZOLES -

Signed and sealed this 4th day of April 1972.

(SEAL)
Attest:

EDWARD M. FLETCHER, JR.　　　　　　　　ROBERT GOTTSCHALK
Attesting Officer　　　　　　　　　　　　Commissioner of Patents